(12) United States Patent
Pellegrini et al.

(10) Patent No.: US 8,978,713 B2
(45) Date of Patent: *Mar. 17, 2015

(54) ENVIRONMENTALLY PROTECTED TUBING AND METHOD OF MAKING IT

(71) Applicant: O'Brien Holding Co., Inc., Saint Louis, MO (US)

(72) Inventors: Michael J. Pellegrini, Saint Charles, MO (US); Shawn P. Rowan, Glendale, MO (US); Marcus C. McCarter, Catawissa, MO (US)

(73) Assignee: O'Brien Holding Co., Inc., Saint Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,205

(22) Filed: Aug. 5, 2013

(65) Prior Publication Data

US 2013/0312863 A1    Nov. 28, 2013

Related U.S. Application Data

(63) Continuation-in-part of application No. 13/091,915, filed on Apr. 21, 2011, now Pat. No. 8,499,800.

(60) Provisional application No. 61/326,962, filed on Apr. 22, 2010.

(51) Int. Cl.
| | |
|---|---|
| *F16L 9/14* | (2006.01) |
| *F16L 9/147* | (2006.01) |
| *B29C 47/00* | (2006.01) |
| *F16L 57/06* | (2006.01) |
| *F16L 58/10* | (2006.01) |
| *F16L 9/19* | (2006.01) |

(52) U.S. Cl.
CPC ............. *F16L 9/147* (2013.01); *B29C 47/00* (2013.01); *F16L 57/06* (2013.01); *F16L 58/1063* (2013.01); *F16L 9/20* (2013.01)
USPC ................. 138/140; 138/137; 138/143

(58) Field of Classification Search
USPC .................. 138/140, 137, 143; 205/640
See application file for complete search history.

(56) References Cited

U.S. PATENT DOCUMENTS

| | | | |
|---|---|---|---|
| 4,091,134 A | 5/1978 | Uemura et al. | |
| 4,211,595 A | 7/1980 | Samour | |
| 4,213,486 A | 7/1980 | Samour et al. | |
| 6,650,815 B2 | 11/2003 | Hawtof et al. | |
| 7,070,833 B2 | 7/2006 | Smith et al. | |
| 2004/0200732 A1* | 10/2004 | Basol | 205/662 |
| 2006/0006073 A1* | 1/2006 | Basol et al. | 205/640 |
| 2007/0017818 A1* | 1/2007 | Emesh et al. | 205/640 |

OTHER PUBLICATIONS

O'Brien; "FLATPAK-MJ Multiple Jacketed Tubing"; www.obcorp.com; Jul. 1, 2009; 2 pages.
"TUNGUM—Alloy Tubing Designed to Perform Specification and Application Guide"; 2011; pp. 1-20.

(Continued)

*Primary Examiner* — Patrick F Brinson
(74) *Attorney, Agent, or Firm* — Polster, Lieder, Woodruff & Lucchesi, L.C.

(57) ABSTRACT

A highly corrosion and abrasion resistant coating combination for high precision metal tubing comprises a passivation layer applied to the tubing and a thermoplastic jacket extruded onto the passivated tubing. In an embodiment, the passivation layer is formed by electropolishing the exterior surface of the tube to remove impurities in an upper layer of the tube.

19 Claims, 5 Drawing Sheets

(56) References Cited

OTHER PUBLICATIONS

Chang, Benjamin; "Gumusut/Kakap Project—Polyurethane Jacket for Offshore Stainless Steel Tubing"; Feb. 26, 2007; pp. 1-11; document No. GKA-100-IN-7880-0000001 Revision 01A; Shell Exploration & Production.

Tiong, Desmond; "Materials Selection for Offshore Instrument Tubing"; 5 pages; (Upstream Materials & Corrosion Team) Chevron Energy Technology Company.

* cited by examiner

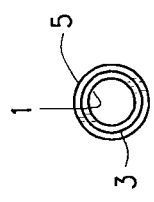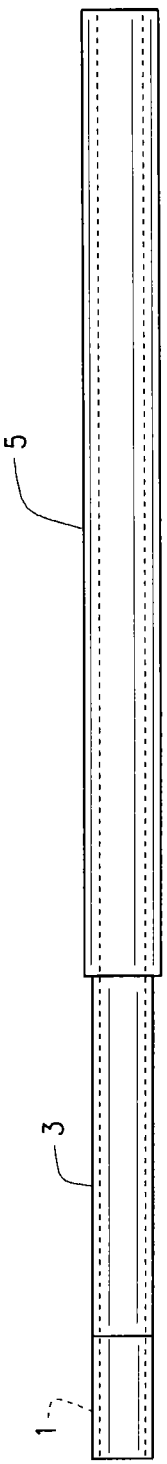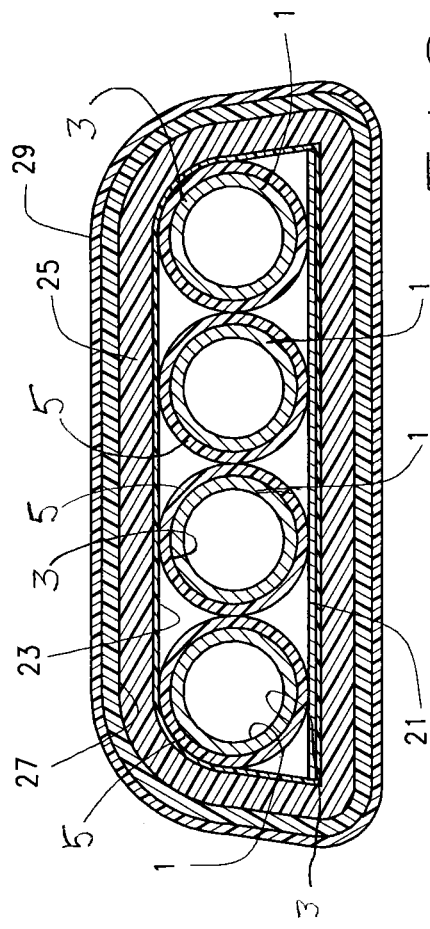

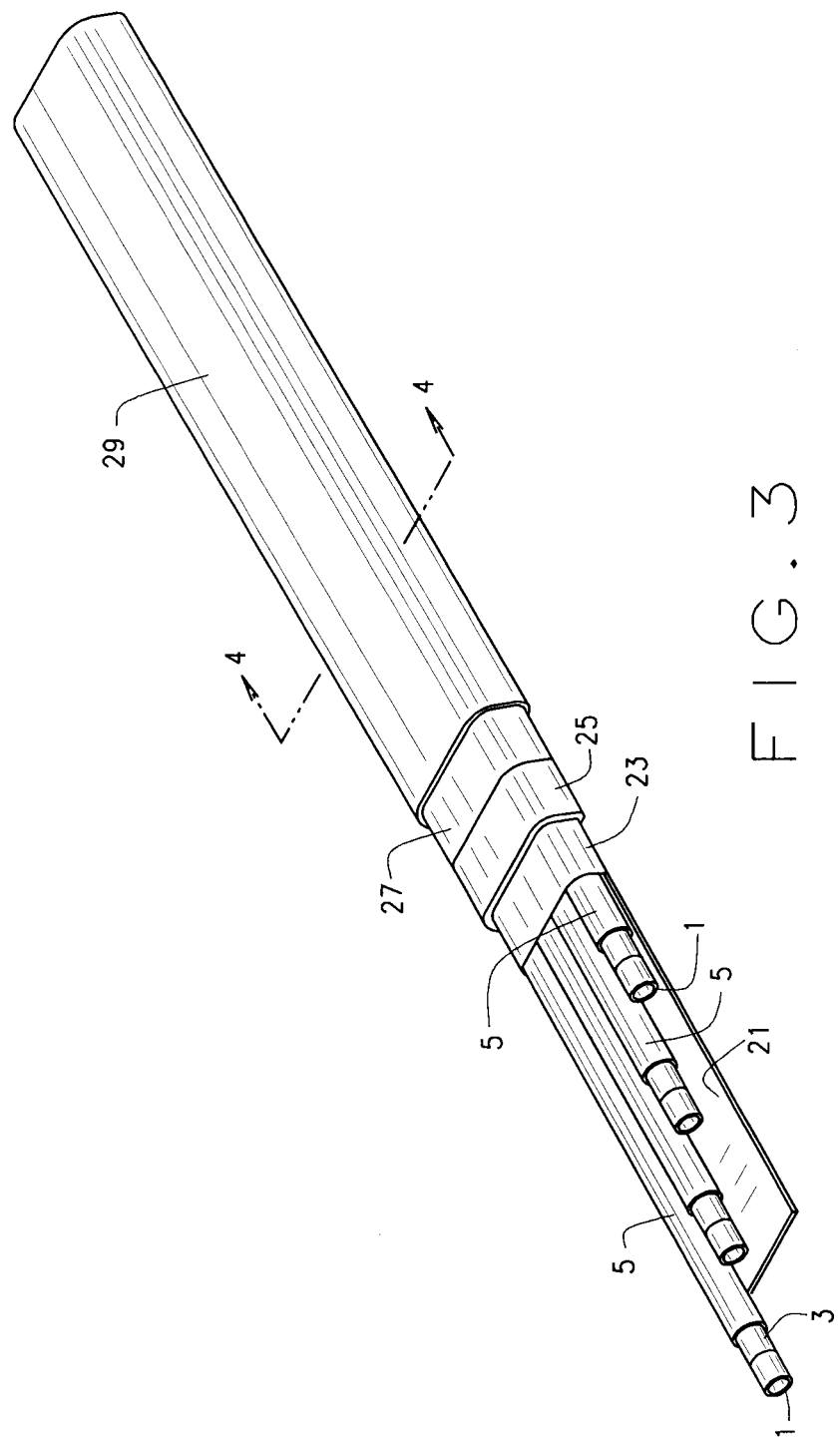

ENVIRONMENTALLY PROTECTED TUBING AND METHOD OF MAKING IT

CROSS-REFERENCE TO RELATED APPLICATIONS

This application is a continuation-in-part of pending U.S. application Ser. No. 13/091,915, filed Apr. 21, 2011, to which priority is claimed. That application claims priority to U.S. Provisional Application 61/326,962, filed Apr. 22, 2010. The disclosures of both of these applications are hereby incorporated by reference.

STATEMENT REGARDING FEDERALLY SPONSORED RESEARCH

Not applicable.

BACKGROUND OF THE INVENTION

This invention relates to metal tubing, and in particular to high precision metal tubing requiring a high degree of environmental protection and methods of making such tubing. Exemplary of such tubing is O'Brien MJ tubing.

The need for protecting metal tubing, and in particular high precision tubing used for instrumentation and control functions, from corrosion and failure in offshore/marine environments is recognized as acute. The problem is discussed, for example, in a technical paper by Chevron Energy Technology Company entitled "Materials Selection For Offshore Instrument Tubing," incorporated herein by reference. Some of the surface contaminants causing corrosion in these applications include sea water, grinding dust, weld slag and microbial agents.

Numerous attempts to increase the corrosion resistance of these tubes have been made. One approach has been to tighten the 316 L metallurgy specification to require more molybdenum content than required per ASTM A269/A213. Others have encased the tubes in impervious plastic jackets. One such attempt is described in Shell Exploration & Production, "Gumusut/Kakap Project—Polyurethane Jacket for Offshore Stainless Steel Tubing," 27 Feb. 2007, incorporated herein by reference. Despite the best efforts of many major companies, tubing failures remain a serious problem.

BRIEF SUMMARY OF THE INVENTION

Briefly stated, one aspect of the present invention is to provide a highly corrosion and abrasion resistant coating combination for high precision metal tubes. This combination has to protect against multiple forms and methods of attack. The tubing has to be protected during installation where abrasion can occur between the tube surface and tray/supports. Coiled tubing can be installed by pulling it into place using a cable winch. This method causes contact and friction between the tubing and tray/support that can lead to scratches and abrasions that can lower the corrosion resistance of the tubing. During construction, the tubing is exposed to welding slag, grinding dusts and other debris that can react with the surface of the tubing and can cause surface corrosion and cracking. An extruded thermoplastic jacket protects the tubing during installation and construction. After installation and commissioning, the tubing will be exposed to corrosive environments including seawater, microbial and other agents.

The inventors have found that an extruded thermoplastic jacket will protect against the corrosive environments except where water ingression is possible. In general, extruded thermoplastic jackets do not adhere to the tubing. Where the jacket meets the exposed end of the tubing, capillary action appears to draw corrosive agents a short distance under the end of the jacket. In this area, corrosion may be worse than would be encountered with an unjacketed tube. An interior coating on the outer diameter of the tubing in accordance with this invention protects against capillary action that may allow water or other liquids to travel between the jacket and tubing. This coating must form a barrier to protect the tubing. This interior coating also protects the tubing during product preparation where the jacket is removed using knives and other tools that may scratch or nick the tubing. The outer surface of the tubing is protected by a two step process which includes the addition of a passivation layer. Illustratively, a silicon passivation layer is applied using a vapor deposition method, before applying a continuous thermoplastic outer jacket. The silicon passivation may be carried out using the methods of U.S. Pat. No. 7,070,833 to David A. Smith, et al, hereby incorporated by reference. Other coatings such as ceramic or zinc may work well for this application.

The passivation layer may also be formed on iron alloys such as stainless steel by removal of iron and removal of contaminants on the outer surface of the tubing. Preferably, the outer diameter of the tubing is treated by electropolishing. The electropolishing removes or reduces raised and lowered microsurfaces on the outside of the tubing and helps form a tighter fit with the thermoplastic jacket, thereby reducing wicking of corrosive liquids under the jacket. Removal of at least a part of the iron from the outer surface of the tubing increases the relative amounts of more corrosion-resistant constituents of the metal tube. Passivation of stainless steel tubing by electropolishing typically produces a thin passivation layer, typically on the order of 20-50 Ångstroms thick. The layer has a lower relative proportion of iron and more chromium and/or molybdenum. It also has a smoother surface than untreated tubing.

A passivation layer may also be formed by electropolishing tubes of many other materials, as is well known in the electropolishing art. Examples of such materials are alloys of aluminum, chromium, cobalt, copper, molybdenum, niobium, nickel, tantalum, titanium, and zirconium, alloyed with each other and with other elements, as well as the pure metals.

Other tubing may be given a passivation layer on their outer diameters by other known means.

Another aspect of the present invention provides a method of protecting and handling the tubing during each step of manufacture. In an embodiment, the tubing is cleaned and passivated as by a nitric acid wash before the passivation layer is produced. Special handling is most critical after the passivation layer has been formed but before extrusion. The passivation layer is typically thin and can be abraded away if it contacts other metal surfaces. In a coil tubing extrusion process, the tubing is placed on a spool to allow back tension to be applied during manufacturing. In normal spooling operations the tube contacts itself and can cause abrasions. A special non-metallic spool with helical grooves is preferably used to ensure that the tubing wraps are separated. Any straightening rollers and centering devices should also be made of non-metallic materials to prevent scratching or abrasions.

When the passivation layer is applied by electropolishing, in an embodiment the tubing may be unspooled into an acid bath and passed through a ring electrode, preferably a toroidal electrode, to produce the passivation layer, then washed in a nitric acid bath, and then washed in a deionized water bath.

After the tubing is passivated, a thermoplastic coating is extruded onto the tubing to form a friction fit over the passivated tubing.

In accordance with another aspect of the invention, bundles of tubing having an electropolished passivating layer on their outer diameters and a thermoplastic coating forming a friction fit over the passivated tubing are provided having a stabilizing wrapping of tape around the bundle of tubes and an extruded protective wrap over the wrapping of tape.

Other aspects of the invention will be apparent to those skilled in the art in light of the following description of illustrative embodiments of the invention. It will be understood by those skilled in the art that many of the features and components of the foregoing patents and applications may be utilized in embodiments of the present invention.

BRIEF DESCRIPTION OF THE SEVERAL VIEWS OF THE DRAWINGS

In the accompanying drawings which form part of the specification:

FIGS. 1 and 2 are views in end and side elevation, respectively, showing a tube in accordance with one embodiment of the present invention.

FIGS. 3 and 4 are views in end elevation and in perspective, respectively, showing a tubing bundle in accordance with one embodiment of the present invention.

DESCRIPTION OF THE PREFERRED EMBODIMENT(S)

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 5:
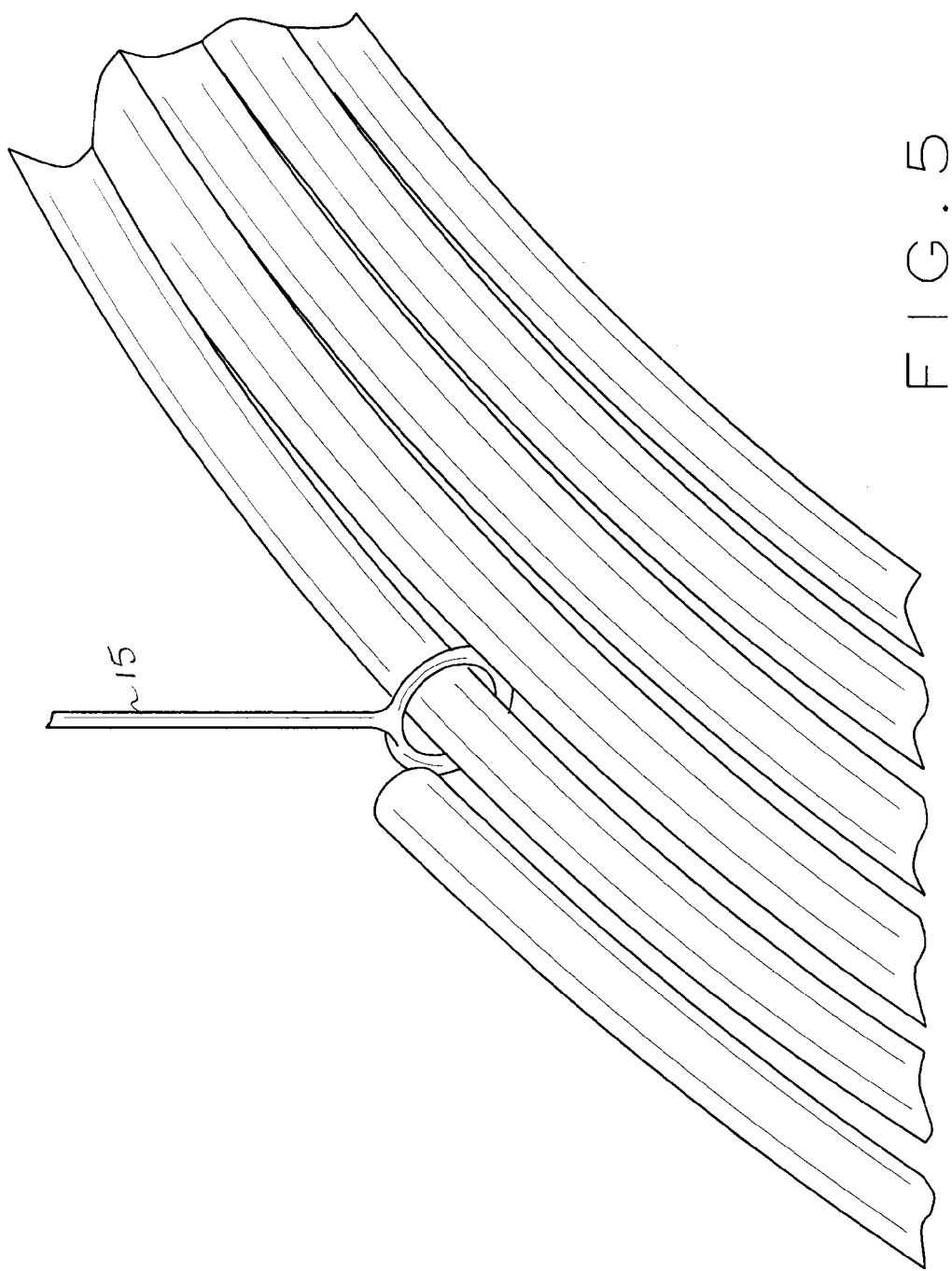
FIG. 5 is a diagrammatic view in perspective of a coiled tube of the present invention suspended by a tool in accordance with the present invention.
Figure 6:
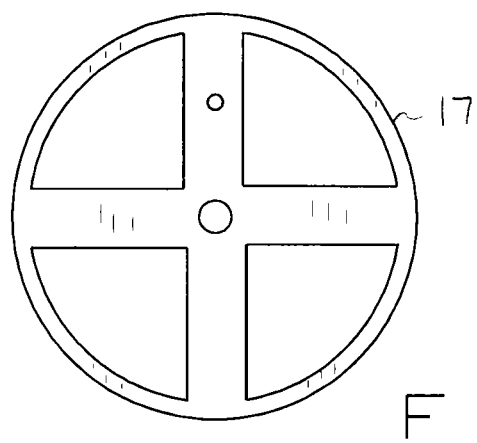
FIGS. 6, 7, and 8 are an end view, a side view, and a detail, respectively, of a coated coil spool for use in an embodiment of the present invention.
Figure 7:
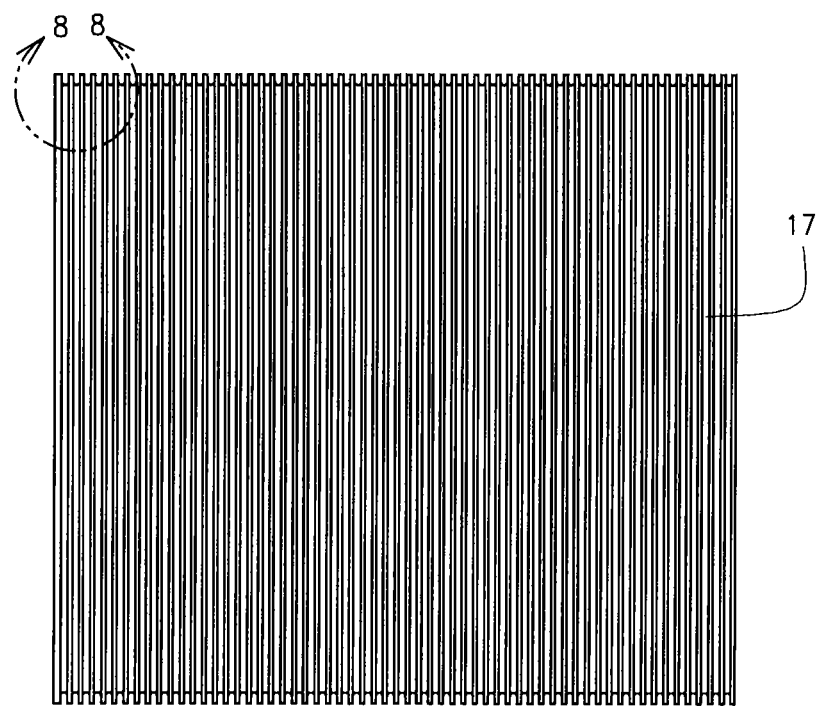
Figure 8:
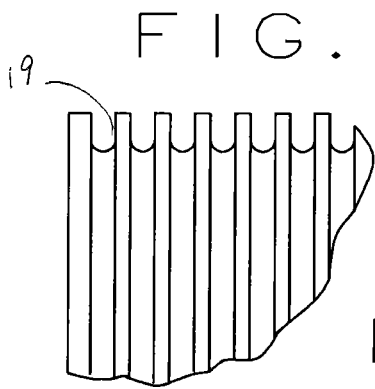

In a first embodiment, base tubing 1 is first passivated in a nitric acid bath for a minimum of 30 minutes and then hand wiped with clean room grade wipes to remove surface residues. The tubing 1 is then level wound on a collapsible coiler and converted to a loose 24-inch diameter coil. The coil is then moved into an ISO Class-7 clean room and wiped down with acetone and then capped with polyethylene caps and placed and sealed in a polyethylene bag. The material is not removed from the bag until the coating is ready to be applied. A silicon passivation layer 3 is then applied using a vapor deposition method like that described in the previously-mentioned U.S. Pat. No. 7,070,833 to David A. Smith, et al. The tubing wraps need to be separated during the vapor deposition process. This is accomplished by applying tension to the ends of the coil to keep it from collapsing or sagging. If required, wires or plastic loops 15 can be used to support the coil and moved during the operation to ensure that the outside diameter of the tubing is completely coated. After coating, the tubing wraps are separated with plastic spacers, such as polyethylene spacers, to ensure no abrasion during transport and storage. Before extrusion, the tubing is spooled with a traversing payout onto a plastic spool 17 made of a non-abrasive plastic such as polyethylene and having helical grooves 19, see FIGS. 6-8. All straightening rollers used to center the tubing are preferably be made of plastic or wood to ensure the tubing is not scratched. The tubing is then extruded with a thermoplastic jacket with a nominal 0.040 inch thickness and wound on a wooden shipping spool.

The preferred thermoplastic is polyether-based thermoplastic polyurethane, although many other suitable materials are known to those skilled in the art, for example polyethylene, polytetrafluoroethylene, silicone, or thermoplastic rubber. Well-known additives such as UV stabilizers, flame retardants, colorants, and the like may of course be included in the jacket material.

Figure 9A:
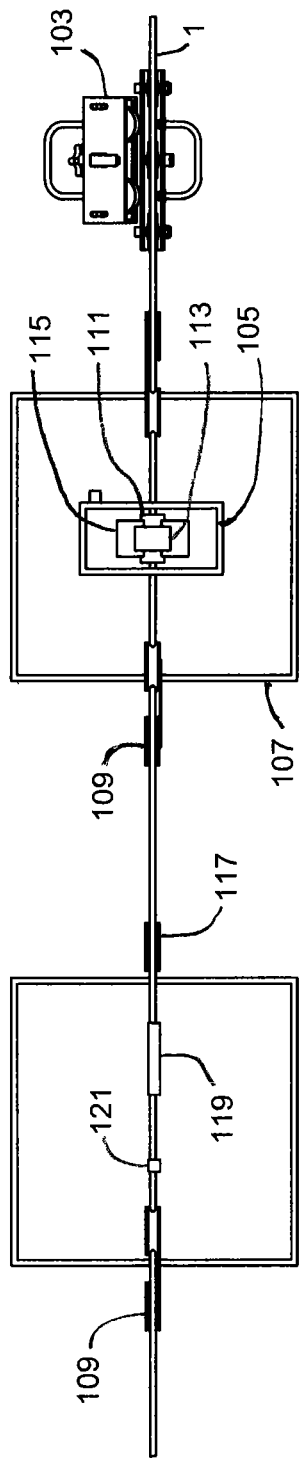
FIGS. 9A and 9B are somewhat diagrammatic views in top plan and in side elevation, respectively, of a tube being moved through an electropolishing apparatus in accordance with another embodiment of the invention.
Figure 9B:
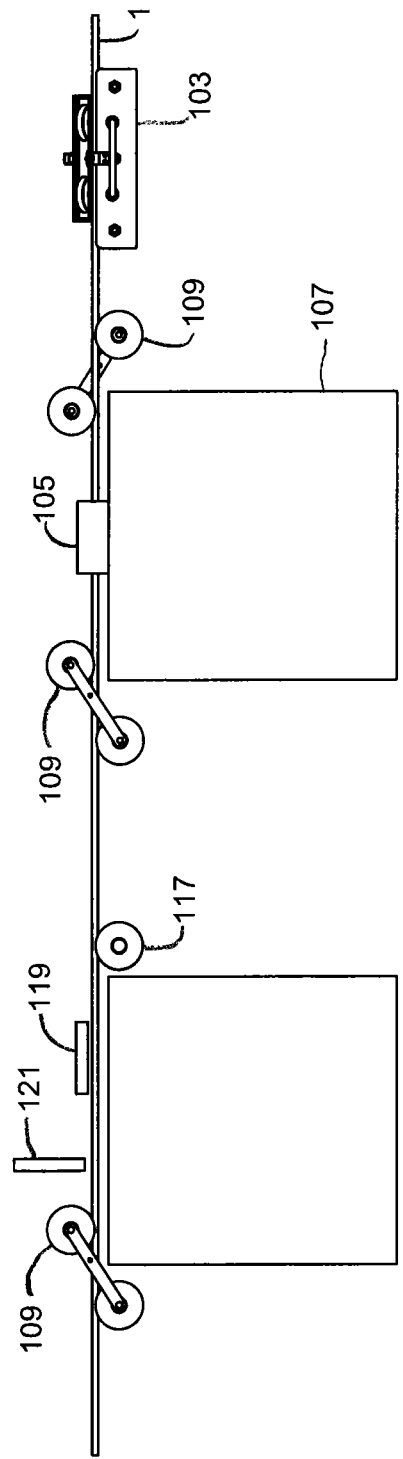

In accordance with a second embodiment, the passivation layer is produced by electropolishing. Electropolishing is one widely known method of applying a passivation layer on metal. Briefly, as shown in FIGS. 9A and 9B, tubing 1 moving from right to left may be uncoiled and straightened by tube straightener 103 into a flood tank 105 of a heated, pumped, electropolishing bath 107 having a composition 50% phosphoric acid and 45% sulfuric acid. The tubing is run through plastic self-centering rollers 109 into a toroidal ring cathode 111. The cathode 111 is interchangeably mounted in a holder 113 supported by a base fixture 115, to allow for electropolishing tubing of different diameters. The tubing 1 forms the anode of the system. The cathode 111 is sized to have an inner diameter about 0.25" greater than the outer diameter of the tube 1. A DC potential of about 10-12 volts is applied, and the tubing is drawn through the cathode 111 at a rate of about one-third of a foot per minute to produce an electropolished passivation layer on the outer diameter of the tubing 1. The tubing 111 is then run by a drive roller 117 through a deionized water rinse 119 and a nitrogen blowoff 121. The passivated tubing is coiled, then dipped in a 20% nitric acid bath for thirty minutes, then dipped in deionized water for twenty to thirty minutes, dried, and placed in a plastic bag until extrusion of a thermoplastic jacket 5 over the tubing, as in the first embodiment. The passivation and extrusion steps may be carried out in the same facility or at different facilities, with a shipping step between them.

As shown in FIGS. 1 and 2, an illustrative embodiment of the tubing of the invention includes a stainless steel tube 1, having a passivation layer 3, and covered with a thermoplastic extrusion 5.

The finished product offers the customer a highly corrosion and abrasion resistant coating combination for high precision metal tubes. The coating combination offers protection against external corrosion during construction caused by weld slag, grinding debris, blast grit and dissimilar metal contamination. It also protects against environmental corrosion caused by salt water, salt spray and drilling mud and capillary action. The coating combination also offers mechanical protection from abrasion during installation and long term effects of vibration.

As shown in FIGS. 3 and 4, the coated and covered tube 1 may be bundled with other such tubes in a package 7 having a protective wrap. If desired, the tubing bundle may include a non-hygroscopic insulation such as a closed cell foam insulation between the tubes 1 and the thermoplastic wrap. Conveniently, the tubes 1 may be placed on an aluminum stabilizing plate 21, wrapped in a Mylar (biaxially oriented polyethylene terephthalate thermoplastic) stabilizing tape 23, wrapped with a Mylar-backed closed-cell foam tape 25, and then wrapped with a second Mylar stabilizing tape 27. The tapes may be provided with pre-applied adhesive. A thermoplastic elastomeric polyurethane weatherproof jacket or wrap 29 is then extruded over the bundle. In other embodiments, the stabilizing tape wrapping is aluminum or aluminum-coated Mylar, and the stabilizing plate and insulation are omitted. The protective wrap is preferably a wrapping of a tape without an adhesive.

In use, the tubes may be handled without extraordinary care, running them wherever needed and attaching them in a standard manner to valves, process equipment, fittings, and the like. Because the jacket is extruded onto the tube, it forms a friction fit with the tube rather than being bonded to it. In use, the jacket may be carefully cut and removed without scratching the underlying tube, using known techniques and tools.

Numerous variations in the device and method of the present invention will occur to those skilled in the art in view of the foregoing disclosure.

Merely by way of illustration, the tubing may be made of other types of stainless steel, such as 2507 Super Duplex, 2205 Duplex, 254 SMO, or of other ferrous and non-ferrous materials and alloys, such as aluminum, cobalt, copper, molybdenum, niobium, nickel, tantalum, titanium, and zirconium.

The passivation step may be carried out in different manners.

These variations are merely illustrative.

All of the patents and printed publications mentioned herein are hereby incorporated by reference.

The invention claimed is:

1. A method of forming environmentally protected tubing comprising applying an extruded thermoplastic coating over tubing having a passivation layer thereon, the passivation layer being formed by electropolishing, the thermoplastic coating forming a friction fit with the tubing without bonding to the tubing.

2. The method of claim 1 wherein the tubing is formed of stainless steel.

3. The method of claim 1 comprising a further step of coiling the tubing on a spool having helical grooves which prevent tubing wraps from contacting each other.

4. The method of claim 3 wherein the spool is made of a non-metallic material.

5. The method of claim 3 wherein the tubing is coiled on the spool after electropolishing and before extruding the thermoplastic coating.

6. The method of claim 1 further comprising bundling the tube with at least one other tube, and applying a protective wrap around the tubes.

7. The method of claim 6 wherein applying a protective wrap around the tubes comprises wrapping a tape around the tubes.

8. A method of forming environmentally protected tubing comprising applying an extruded thermoplastic coating over stainless steel tubing having a passivation layer on an outer surface thereof, the passivation layer having a lower iron content and a higher content of at least one element selected from the group consisting of chromium and molybdenum than the tubing below the passivation layer.

9. The method of claim 8 wherein the tubing is coiled and thereafter passivated.

10. The method of claim 8 comprising a step of producing the passivation layer by electropolishing.

11. The method of claim 8 further comprising bundling the tube with at least one other tube, and applying a wrap around the tubes.

12. Environmentally protected tubing comprising a metal tube containing iron and chromium, a passivation layer on the tube, the passivation layer comprising more chromium and less iron than the body of the tube, and a thermoplastic coating applied to the passivation layer, the thermoplastic coating forming a friction fit with the tubing without bonding to the tubing.

13. The tubing of claim 12 wherein the tube is bundled with at least one other tube, the bundled tubes having a wrap of protective material around them.

14. The tubing of claim 12 wherein the tube is formed of stainless steel and the passivation layer is formed by electropolishing.

15. Environmentally protected tubing comprising a metal tube, an electropolished passivation layer on the tube, and a thermoplastic coating applied to the passivation layer, the thermoplastic coating forming a friction fit with the tubing without bonding to the tubing.

16. The environmentally protected tubing of claim 15, wherein the tube is bundled with at least one other tube, the bundled tubes having a wrap of protective material around them.

17. The tubing of claim 16 wherein the wrap of protective material comprises a wrapping of tape around the tubes.

18. The tubing of claim 17 wherein the tape comprises at least one material selected from the group consisting of thermoplastics and metals.

19. The tubing of claim 17 further comprising a jacket of thermoplastic material around the wrapping of tape.

* * * * *